United States Patent Office 2,957,025
Patented Oct. 18, 1960

2,957,025

PREPARATION OF A CALCIUM CHLORIDE DOUBLE SALT OF CALCIUM PANTOTHENATE

Jonathan O. Brooks, Brooklyn, N.Y., assignor to Chas. Pfizer & Co. Inc., Brooklyn, N.Y., a corporation of Delaware No Drawing. Filed Nov. 24, 1953, Ser. No. 394,200

2 Claims. (Cl. 260—534)

This invention relates to the preparation of calcium pantothenate, and more particularly, to an improved process for preparing and recovering calcium pantothenate in biologically-active, non-hygroscopic form through formation of a calcium chloride double salt of calcium pantothenate.

It is known to prepare calcium pantothenate by condensing α-hydroxy-β,β-dimethyl-γ-butyrolactone with calcium β-alaninate in alcohol, while maintaining anhydrous conditions to permit recovery of the calcium pantothenate. In fact, solvents containing greater than one percent moisture have not heretofore been believed to be operative, a factor which severely limits the practical application of the reaction. Furthermore, in order to maintain anhydrous conditions, it is essential that a metal salt of β-alanine be employed as a starting material, thereby resulting in yields which are not particularly advantageous from the commercial standpoint.

It has now been found that a biologically-active form of pantothenic acid can be prepared in excellent yields by the reaction of β-alanine, calcium oxide and α-hydroxy-β,β-dimethyl-γ-butyrolactone without maintaining the anhydrous conditions heretofore believed to be essential. In accordance with one embodiment of this invention, β-alanine and calcium oxide are mixed in an alcohol solvent and therein reacted with α-hydroxy-β,β-dimethyl-γ-butyrolactone to form calcium pantothenate. It has further been found that the calcium pantothenate thus formed is readily separated from the reaction mixture by adding calcium chloride thereto and thus preparing the calcium chloride double salt of calcium pantothenate, which has the following structural formula:

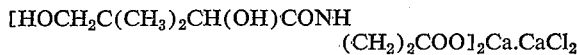

[HOCH$_2$C(CH$_3$)$_2$CH(OH)CONH(CH$_2$)$_2$COO]$_2$Ca.CaCl$_2$

The double salt so formed is non-hygroscopic and exhibits a substantial vitamin B activity, thereby rendering it particularly suitable for use, without purification, in animal feeds or animal feed supplements. Of course, in the production of biologically-active calcium pantothenate, the lactone may be in the levorotatory form or may be a mixture of dextrorotatory and levorotatory forms. However, since the "l" form can only be obtained through an expensive resolution of the "dl" form, the latter is preferred for producing feed grade material. In such event, the product contains approximately equal proportions of the dextrorotatory and levorotatory forms of calcium pantothenate, the "d" form being the biologically-active form.

The reaction is conducted in an alcohol solvent, preferably a low molecular weight primary or secondary alkanol having from one to five carbon atoms. It is desirable to employ at least an amount necessary to dissolve the reactants. Methanol is preferred for reasons of economy. It is unnecessary to maintain anhydrous conditions during the reaction; to the contrary, as much as one mole of water per mole of calcium oxide is developed. In fact, it has been found that as much water as 5% by weight of the alcohol solvent is tolerated without serious effect on the yield. It is preferred to add the β-alanine first to the alcohol and then slowly introduce the necessary quantity of calcium oxide which reacts with the β-alanine to form the calcium salt thereof and water. Thereafter, the above-mentioned lactone is added in an amount sufficient to condense with the calcium β-alaninate and the reaction mixture is maintained at a temperature from about 40° to 120° C., preferably at reflux conditions, until the condensation is complete. At temperatures lower than 40° C. the reaction proceeds at such a slow rate as to be impractical. When employing methanol as the solvent, a temperature of from 50° to 65° C. has been found to be advantageous. Generally, a reaction time of about 2 hours is sufficient for most purposes at the conditions specified. It will be apparent to those skilled in the art that the order of the reactants can be varied without departing from the desired result.

When the reaction is complete, the calcium pantothenate-containing mixture may be concentrated by removal of the alcohol under reduced pressure to recover the calcium pantothenate, which can be used as such or purified if desired. However, it is preferred to recover the calcium pantothenate by forming the aforesaid calcium chloride double salt in order to provide a more readily marketable material and because it offers substantial economies over the aforesaid procedure. This is accomplished by adding calcium chloride to the final reaction mixture in an amount sufficient to form the calcium chloride double salt, which promptly precipitates out and may be removed by centrifuging, filtration and the like. Anhydrous calcium chloride is employed for best results. Before removal of the double salt, the mixture may, of course, be cooled to improve the yield.

The molar proportions of the reactants can be varied considerably. However, it is generally preferred to employ equimolecular proportions of β-alanine and α-hydroxy-β,β-dimethyl-γ-butyrolactone, 2 mols. of each being necessary for each mole of calcium oxide present. Furthermore, at least 1 mole of calcium chloride is used for each 2 mols. of the β-alanine or lactone. For optimum results it is preferred to employ an excess of the calcium oxide and calcium chloride, say up to 10 percent and 50 percent, respectively, over and above these amounts.

EXAMPLE I

An amount of 4.8 kg. of β-alanine was added to a vessel containing 4 gallons of methanol and 1.6 kg. of calcium oxide was slowly added to the mixture thus prepared. The temperature rose to about 45° C. during the course of the calcium oxide addition. Thereafter, 7.0 kg. of α-hydroxy-β,β-dimethyl-γ-butyrolactone dissolved in 6 gallons of methanol was added to the vessel. When the temperature started to drop, heat was applied to maintain a temperature of about 50 to 65° C., which was held for a period of two hours.

The calcium pantothenate thus prepared was then treated with 3.8 kg. of anhydrous calcium chloride. The calcium double salt began crystallizing immediately. Thereafter, the mixture was slowly cooled to 25° C., precipitating additional calcium chloride double salt. An amount of methanol sufficient to thin out the resulting slurry was added and the mixture was centrifuged to remove the salt. The product was dried at 50° C. and found to weigh about 12 kg. Upon analysis, it was found to contain 77% calcium pantothenate, 18% calcium chloride and 3% free β-alanine. The yield from β-alanine to calcium pantothenate was about 72%.

As stated, the calcium chloride double salt of calcium pantothenate prepared in accordance with this invention is particularly suited for use in animal feeds, in view of its non-hygroscopic nature and its stability in the presence of air and light. The calcium pantothenate salt can be incorporated as such in feedstuffs lacking sufficient vitamin B activity, or it can be incorporated in feed supplements along with other vitamins and with minerals for the purpose of preparing nutritionally-balanced animal feed compositions. In either case, antibiotics may also be employed for their growth stimulation and/or other properties.

The purpose of the calcium pantothenate in such compositions is to supply pantothenic acid, one of the essential factors of the vitamin B complex. The importance of pantothenic acid in nutrition is well established. A deficiency of this vitamin results in poor growth of chicks, ragged feather development, and various forms of dermatitis characterized by scabby sores at the corners of the mouth, on the eyelids, and swollen, cracked feet. In mature birds a deficiency causes poor hatchability of eggs. In pigs, a deficiency of pantothenic acid causes poor appetite, slow growth, scours, dermatitis, and stilted gait. In recent tests these deficiency symptoms were observed in a group of young pigs fed a 14% protein diet. However, with the addition of 8 grams of calcium pantothenate per ton of feed the symptoms disappeared and a response of 60% gain in weight over that obtained with the basal ration was observed.

A typical feed in which the calcium pantothenate double salt of this invention may be used to advantage, may contain roughly between 50% and 80% of grains, between 3% and 10% of animal protein, between 5% and 30% of vegetable protein, between 2% and 4% of minerals, together with other supplementary vitaminaceous substances. The calcium pantothenate is added to such feeds generally in an amount sufficient to provide the biologically required equivalent of dextrorotatory pantothenic acid in the finished feed. It will be appreciated that the amount of the calcium pantothenate so added may vary considerably, depending upon the particularly feed constitution, the animal for which it is intended, and the form of the calcium pantothenate, i.e. whether it is dextrorotatory or a mixture of the dextrorotatory and levorotatory forms. In general, about twice as much as the "dl" form is required than in the case of the "d" form in order to provide approximately the same equivalent of biologically-active pantothenic acid. For growing swine the daily allowance recommended by the National Research Council is 18 to 20 mg. pantothenic acid per 100 lb. of live weight. The recommended allowance of pantothenic acid for growing chicks and breeding hens is 5 mg. per 1 lb. of feed. Furthermore, an amount of 2.5 mg. of pantothenic acid per pound is recommended for laying hens whose eggs are not to be used for hatching. About 6 mg. per 1 lb. of feed are required for turkeys. In order to meet these requirements, it is generally preferred to employ an amount of the calcium chloride double salt of calcium pantothenate ("d" form) ranging from about 2 to 7 mg. per pound of feed and an amount of the racemic "dl" form ranging from about 4 to 14 mg. per pound of feed. The amount of calcium pantothenate employed in feed supplements is varied accordingly.

A typical poultry formula in which the calcium pantothenate double salt of this invention may be employed is set forth below, it being understood that various other formulae may be compounded to meet the needs of individual situations.

*Table I*

| | |
|---|---|
| White corn meal: percent by weight | 76 |
| Fish meal (Menhaden): percent by weight | 22 |
| Alfalfa meal: percent by weight | 1.0 |
| Calcium carbonate: percent by weight | 0.5 |
| Salt (iodized): percent by weight | 0.3 |
| Manganese sulfate: grams/100 lb. | 10 |
| Riboflavin USP: mg./lb. | 2 |
| Niacin: mg./lb. | 14 |
| Vitamin A: i.u./lb. | 4000 |
| Vitamin D: i.u./lb. | 300 |
| Choline chloride: percent by weight | 0.3 |
| Methionine (dl): percent by weight | 0.05 |
| Diamine penicillin: gm./ton | 2 |
| Oxytetracycline ("Terramycin"): g./ton | 5 |
| Folic acid: mg./lb. | 5 |
| Vitamin E: gm./100 lb. | 0.5 |
| Pyridoxine: mg./lb. | 1.6 |

The efficacy of the calcium chloride double salt of calcium pantothenate ("dl") in feedstuffs was demonstrated by supplementing portions of the feed of Table I with USP calcium pantothenate ("d") and the aforesaid calcium chloride double salt of calcium pantothenate ("dl"), respectively, and observing the growth response of chicks placed on those rations. In each case, the calcium pantothenate ("d" and "dl" forms) was employed in an amount sufficient to furnish the equivalent of 3 and 5 mg. of biologically-active pantothenic acid per pound of feed. The chicks (New Hampshire Reds) employed in these tests were divided into groups of 16 each and fed the described feeds over a period of 4 weeks, during which the growth response and feed efficiency were recorded. The results of these tests appear in Table II.

*Table II*

| Group No. | Basal Diet | Pantothenic Acid | | 0 | 1 | 2 | 3 | 4 | Growth Index | Feed Efficiency |
|---|---|---|---|---|---|---|---|---|---|---|
| | | Form Added | Equivalent mg./lb. | | | | | | | |
| 1 | Formula of Table I | | | 42 | 63 | 99 | 141 | 205 | 100 | 2.61 |
| 2 | do | Ca Pantothenate (d) USP | 3 | 40 | 62 | 100 | 151 | 231 | 113 | 2.09 |
| 3 | do | CaCl₂ Double Salt Ca Pantothenate (dl) | 3 | 43 | 67 | 102 | 165 | 236 | 115 | 2.27 |
| 4 | do | Ca Pantothenate (d) USP | 5 | 41 | 66 | 105 | 162 | 241 | 100 | 2.20 |
| 5 | do | CaCl₂ Double Salt Ca Pantothenate (dl) | 5 | 44 | 63 | 102 | 160 | 239 | 116 | 2.55 |

In the above table, growth index is a measure of growth response (in terms of weight) to the calcium pantothenate supplementation in relation to the basal feed without such supplementation, the higher the index the greater the response. Feed efficiency is the ratio of the weight of feed required per unit weight of growth increase, the lower the ratio the higher the efficiency of the particular feed. As indicated in Table II, the calcium chloride double salt of calcium pantothenate ("dl"), at levels equivalent to 3 and 5 mg. of pantothenic acid per pound of feed, compared favorably in growth promoting effect with the "d" form of calcium pantothenate USP at the corresponding levels of pantothenic acid. Furthermore, the growth promotion induced by the calcium chloride double salt was significantly greater than the growth response observed with the basal diet lacking pantothenic acid supplementation. The feed efficiency with the calcium chloride double salt ("dl") also compared favorably with the pure "d" isomer of calcium pantothenate. Similar results were observed in additional tests with other feeds and typical symptoms of pantothenic acid deficiencies were evident in the control groups, which incidentally experienced high mortality.

Resort may be had to such modifications and equivalents as fall within the spirit of the invention and the scope of the appended claims.

I claim:

1. A process for preparing a calcium chloride double salt of calcium pantothenate which comprises reacting β-alanine with calcium oxide and α-hydroxy-β,β-dimethyl-γ-butyrolactone in a lower alkanol solvent at a temperature of from about 40° to 120° C. while accumulating water of reaction, the amount of water present in the reaction mixture based on the weight of solvent and including water of reaction being up to 5% by weight of the solvent, adding calcium chloride to resulting reaction mixture, the amount of calcium chloride added being equal to one mol of calcium chloride per mol of calcium pantothenate present in said reaction mixture, and recovering resulting crystalline, non-hygroscopic calcium chloride double salt of calcium pantothenate of the formula:

[HOCH$_2$C(CH$_3$)$_2$CH(OH)CONH(CH$_2$)$_2$COO]$_2$Ca·CaCl$_2$

2. A process as set forth in claim 1 wherein the solvent is methanol and the temperature is maintained at from about 50 to about 65° C.

References Cited in the file of this patent
UNITED STATES PATENTS

| | | |
|---|---|---|
| 2,369,839 | Moore | Feb. 20, 1945 |
| 2,390,499 | Carlson et al. | Dec. 11, 1945 |
| 2,449,340 | Tanner et al. | Sept. 14, 1948 |
| 2,496,363 | Wilson et al. | Feb. 7, 1950 |
| 2,703,285 | Luther | Mar. 1, 1955 |
| 2,717,267 | Garbarini | Sept. 6, 1955 |

FOREIGN PATENTS

| | | |
|---|---|---|
| 553,317 | Great Britain | May 17, 1943 |